O. L. SMITH AND H. S. NORMAND.
MACHINE FOR MAKING SNAP FASTENERS.
APPLICATION FILED FEB. 21, 1917.

1,431,990.

Patented Oct. 17, 1922.
4 SHEETS—SHEET 1.

Inventors.
Oscar L. Smith and
Henry S. Normand
by Robt P Haines
atty.

O. L. SMITH AND H. S. NORMAND.
MACHINE FOR MAKING SNAP FASTENERS.
APPLICATION FILED FEB. 21, 1917.

1,431,990.

Patented Oct. 17, 1922.

Inventors
Oscar L. Smith and
Henry S. Normand.
by Rob't F. Hains, atty

O. L. SMITH AND H. S. NORMAND.
MACHINE FOR MAKING SNAP FASTENERS.
APPLICATION FILED FEB. 21, 1917.

1,431,990.

Patented Oct. 17, 1922.
4 SHEETS—SHEET 3.

Inventors
Oscar L. Smith and
Henry S. Normand
by Robt P. Hains atty.

O. L. SMITH AND H. S. NORMAND.
MACHINE FOR MAKING SNAP FASTENERS.
APPLICATION FILED FEB. 21, 1917.
1,431,990.
Patented Oct. 17, 1922.
4 SHEETS—SHEET 4.
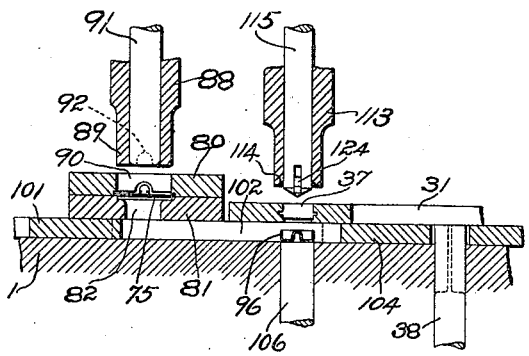
Fig 15
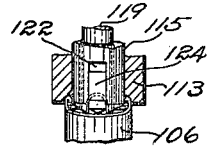
Fig 18
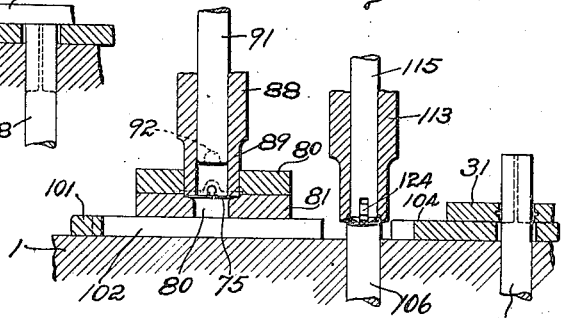
Fig 17
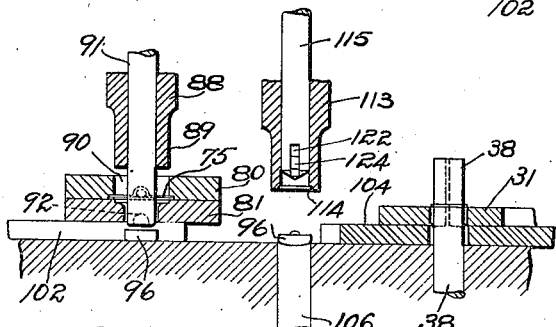
Fig 16
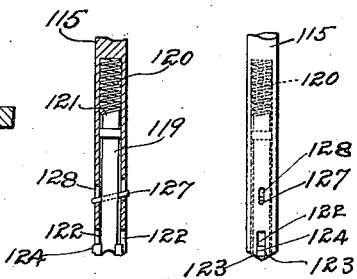
Fig 19   Fig 20
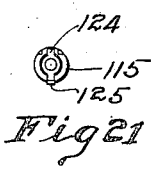
Fig 21
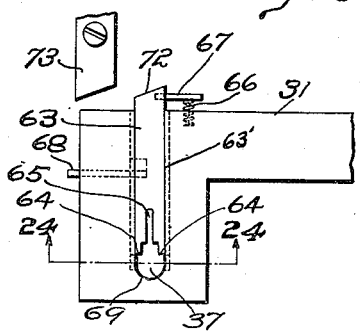
Fig 22
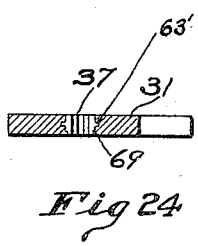
Fig 23
Fig 24
Inventors
Oscar L. Smith and
Henry S. Normand
by Rob't P. Harris atty.

Patented Oct. 17, 1922.

1,431,990

UNITED STATES PATENT OFFICE.

OSCAR L. SMITH AND HENRY S. NORMAND, OF PHILADELPHIA, PENNSYLVANIA, ASSIGNORS TO CONSOLIDATED AMERICAN FASTENER COMPANIES, INC., OF NEW YORK, N. Y., A CORPORATION OF NEW YORK.

MACHINE FOR MAKING SNAP FASTENERS.

Application filed February 21, 1917. Serial No. 150,006.

*To all whom it may concern:*

Be it known that we, OSCAR L. SMITH and HENRY S. NORMAND, citizens of the United States, residing in Philadelphia, county of Philadelphia, State of Pennsylvania, have invented an Improvement in Machines for Making Snap Fasteners, of which the following description, in connection with the accompanying drawings, is a specification, like characters on the drawings representing like parts.

The invention to be hereinafter described relates to machines for making snap fasteners, and more particularly for making snap fasteners of that general type wherein a stud of one member is adapted to be received by a hollow post forming part of a cup or socket member and provided with opposite slots through which project portions of a spring to hold the two members in engaged relation and yet permit their ready disengagement by the application of force.

Various forms of such snap fasteners are well known, but in their manufacture, difficulty has been experienced in forming the completed cup or socket member with its spring for engaging the stud of the other member of the snap fastener. To do this successfully on a commercial scale, the machine must be so contrived that the cup or socket member may be formed and held in fixed position while the spring is transferred thereto, and both the cup or socket member and the spring must be so relatively positioned that when they are assembled the portions of the spring that are to extend into the slots of the hollow post of the cup or socket member shall properly register. Any possibility of shift in the predetermined relation of these parts, frequently results in the spring being improperly seated in the cup or socket member, and as a result, the completed cup or socket member becomes useless.

An important feature of the present invention, therefore, consists in holding the cup or socket member locked in a fixed position so that it cannot shift in its rotative relation to the spring prior to or during their assemblage, and in securing the spring in a fixed predetermined position in its carrier until it is transferred to the cup or socket member.

During the transfer of the spring to the cup or socket member, the spring is liable to shift or change the established relation between it and the cup or socket member, and this is particularly so as the ends of the spring pass over the top of the socketed post or stub projecting from the cup or socket member. Another important feature of the present invention, therefore, consists in means for engaging between the end portions of the spring as it is being transferred to the cup or socket member and slightly separating them while still in engagement with both, so that they will slip readily over the hollow post or stud and register with the slots in the sides thereof. Another important feature of the invention consists in causing the spring transferring means to bend the end portions of the spring downwardly or to one side of the plane of the spring prior to its transfer to the cup or socket member.

In order that the spring may be bent into desired shape and at the same time not be thrown or dislodged from the spring forming means as successive portions of the spring are bent, the present invention contemplates that the wire shall be bent into the desired form while in a fixed or stationary position. To this end a former is mounted to be raised and lowered to and from operative position at a fixed point in the machine, and while in such fixed position, benders act upon the wire to bend it about the former into the desired shape. After the spring has been formed it will cling to the former about which it has been bent and must be taken therefrom to the spring inserting station for transfer to the cup or socket member. An important feature of the invention in this respect consists in a spring carrier having an opening through which the former may be projected to its operative position above the carrier, and after the wire has been bent about the former, the latter may be withdrawn from the opening thereby stripping the spring from the former and leaving it in the carrier, which may then be moved to transfer the spring to the inserting station.

The above features of the invention and other important and novel characteristics thereof will be hereinafter described in connection with the accompanying drawings which illustrate one good, practical form thereof, it being understood that details of the various means employed may be varied without departing from the true scope of the invention as defined by the claims.

In the drawings:—

Fig. 15 is a sectional view showing a cup or socket member held in fixed position for insertion of the spring, and the relations of the cup-forming dies, the transfer plunger, and the spring former;

Fig. 16 is a similar view with the parts in another position;

Fig. 17 is a similar view with the parts in still another position;

Fig. 18 is an enlarged detail of the position of the transfer plunger and lip turner at the final stage of securing the spring in the cup or socket member;

Fig. 19 is a sectional detail showing more particularly the transfer plunger and its spring engaging member;

Fig. 20 is a side view of the parts indicated in Fig. 19 at right angles thereto;

Fig. 21 is a view looking at the end of the transfer plunger;

Fig. 22 is a detail showing a part of the spring carrier and its clamp;

Fig. 23 is a detail side view of the same; and

Fig. 24 is a sectional detail on line 24—24, Fig. 22.

Figure 1:
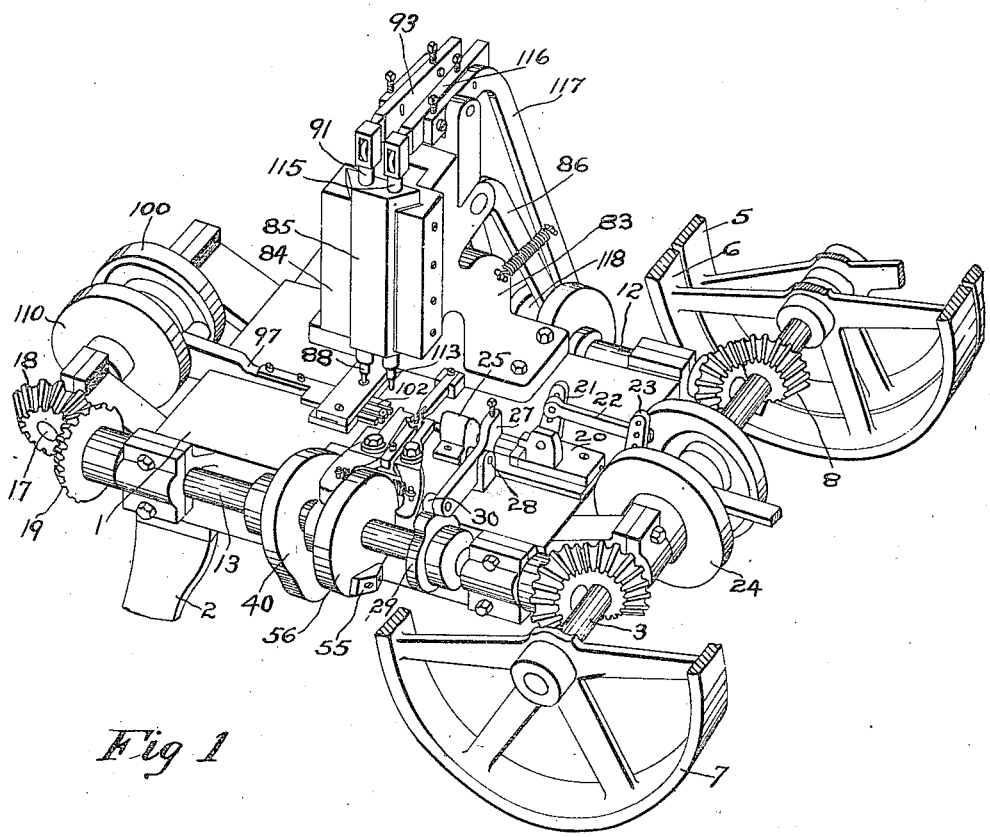
Figure 1 is a perspective view of the main portions of a machine embodying the present invention, some of the parts being omitted and others broken away for clearness of illustration.
Figure 3:
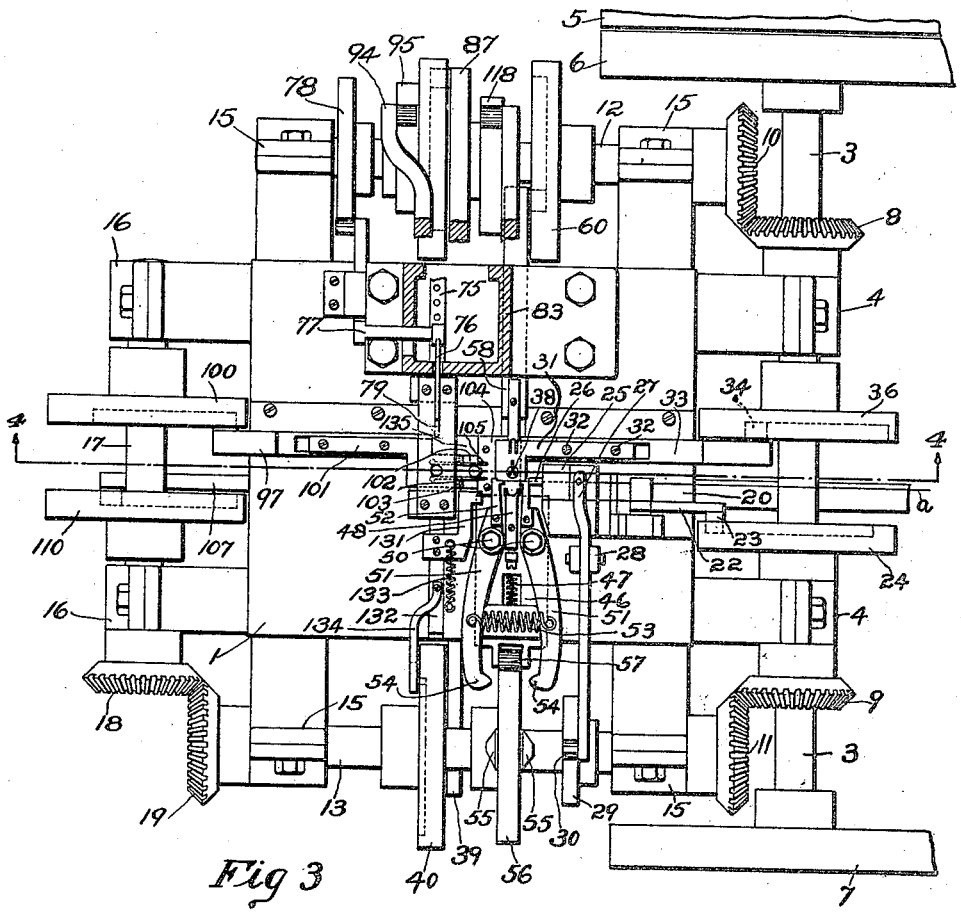
Fig. 3 is a plan view, some of the parts being broken away.

The machine frame may be of any desired character suitable for supporting the operating parts, and as shown comprises a bed plate 1 mounted on legs or supports 2. It is convenient to form the bed plate 1 of substantially rectangular shape, as shown in Figs. 1 and 3. Mounted in suitable bearings supported by the machine frame are the driving and cam shafts which receive motion from any suitable source of power. In the present instance of the invention, the driving shaft 3, Figs. 1 and 3, is supported in suitable bearings 4 secured to the main frame, and has secured thereto the fast and loose pulleys 5 and 6 which may be driven as usual. The main shaft 3 may also have a balance or fly wheel 7 that the speed of the parts may be rendered more steady and uniform. Secured to the driving shaft near opposite end portions are the bevel gears 8 and 9 which are operatively engaged with similar bevel gears 10 and 11 secured to the cam shafts 12 and 13 respectively. The cam shafts 12 and 13 are mounted in suitable bearings 15 secured to the machine frame, and have mounted thereon certain cams for transmitting motion to the operating parts, as will more fully appear. Mounted in bearings 16 is the cam shaft 17 having secured thereto the bevel gear 18 which is operatively engaged with a similar bevel gear 19 on the cam shaft 13, the construction being such that upon rotation of the driving shaft 3, the cam shafts 12, 13, and 17, and the cams secured thereto, will be suitably driven.

It will be appropriate to first describe the spring-forming mechanism, and the spring carrier for taking the spring from the forming mechanism and moving it between the spring-forming and inserting stations after it has been formed.

The wire of which the spring is formed may be taken from any suitable source of supply and delivered to the shaping or forming mechanism. In the present instance of the invention, the wire $a$ is taken from the supply and passed through the wire feed block 20 to which is pivotally connected the wire clamp arm 21, Fig. 1, having pivoted to its upper portion the link 22 which is itself connected to an arm 23 in operative engagement with a cam 24 on the driving shaft 3, the construction being such that upon rotation of the cam 24, the wire will be first clamped by the lower end of the arm 23 and then moved to the left, Fig. 1, to feed the wire. The wire feed devices are not shown in detail, because they are and may be of usual construction well understood by those skilled in the art. The end of the wire $a$ passes through a guide block 25 having the projecting portion 26, Fig. 3, and to hold the wire as the wire feed block recedes, a wire clamp 27 is pivoted at 28 and is operated in the usual and well understood manner for clamping or holding the wire and preventing its backward movement with the wire feed block. A cam 29 acts upon the roll 30 to cause the inner end of the clamp to forcibly hold the wire against a fixed abutment beneath as the feed block retreats after feeding the wire.

Mounted to slide on the machine frame is the spring carrier which is reciprocated longitudinally between the spring forming and transferring positions. In the present instance of the invention, the spring carrier comprises a plate 31 secured by screws 32 to a slide 33 movable longitudinally in guides formed in the machine bed and provided with a pin or roll 34, Fig. 4, which engages the groove 35 of the cam 36 secured to the driving shaft 3, the construction being such that upon rotation of the driving shaft, the spring carrier will be reciprocated in a plane above the machine bed.

The spring carrier has an opening 37 extending therethrough, Figs. 15 and 22, and a former 38 is adapted to be projected through the opening and be withdrawn therefrom. In the present instance of the invention the former 38 is operatively mounted on an arm 39 under the machine bed, Fig. 4, which is actuated to raise and lower the former by means of a cam 40, Figs. 1 and 3. The end of the arm 39 has threaded thereto at 41, the lower end of the former, Fig. 4, and a spring 42 is interposed between the lower surface of the bed plate and a collar or yoke 43 mounted on the former normally acting to lower the former, the construction being such that upon rotation of the cam 40, the former 38 will be projected through the opening 37 of the spring carrier and then withdrawn therefrom, as will more fully appear.

Figure 5:
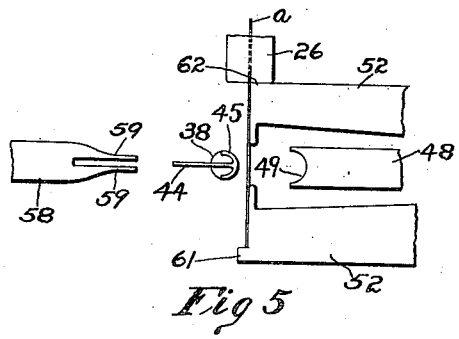
Figs. 5, 6, 7 and 8 show in plan view successive operations of the wire or spring-bending means.
Figure 6:
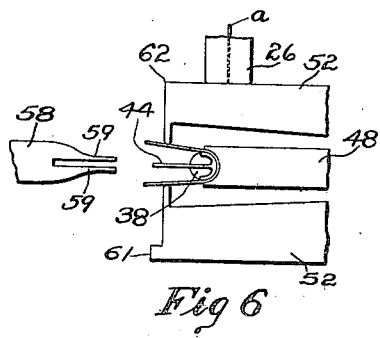

The shape of the spring to be produced determines the shape of the former at the upper portion thereof, and in the present instance of the invention, the upper portion of the former 38 is shaped substantially as indicated more clearly in Figs. 5, 6, 7 and 8, wherein the former 38 has a tongue 44 and side portions 45. Mounted for movement toward and from the spring forming station is the bender slide 46, normally held frontwardly by a spring 47, Fig. 3. Secured to the bender slide 46 is the front bender 48 having a curved end portion 49 substantially as indicated in Fig. 5, for conforming the spring to the rounded contour of the front portion of the former. Pivotally mounted on the bender slide 46 at 50 are the side benders which, in the present instance of the invention, comprise the arms 51 carrying at their rear portions the bender fingers 52. These bender fingers are shown in their general relation to the side bender arms 51, and the front bender 48 in Fig. 3, and the particular construction thereof is illustrated on enlarged scale in Figs. 5, 6, 7 and 8. The front portion of the bender arms 51 are yieldingly held toward each other by a spring 53, Fig. 3, the ends 54 of said arms being adapted to engage at times as will more clearly appear, the projections 55 on the side of the cam 56, Figs. 1 and 3. Mounted on the bender slide 46 and normally held pressed against the periphery of the cam 56 is the roll 57, Fig. 3, engagement between the roll and cam 56 being effected by the spring 47, and the construction being such that as the cam 56 is rotated, the bender slide 46 will be moved rearwardly into spring-forming position, as will more fully appear, and then the side benders will be caused to act upon the side of the spring or wire about the former by the projections 55 on the cam 56.

Mounted in suitable guideways in the rear of the machine and opposite the former, is an end bender 58, shown in Fig. 3, and illustrated on an enlarged scale in Figs. 5, 6, 7 and 8. The end of the bender 58 is slotted to form the two bender portions 59, and said rear bender 58 is actuated by a suitable cam 60, Fig. 3, to move it in timed relation to its co-operating parts toward and from the former.

Figure 7:
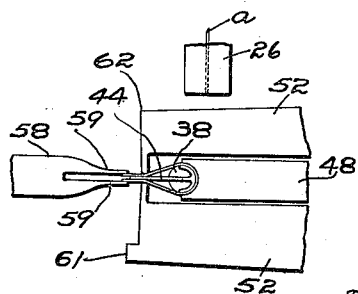
Figure 8:
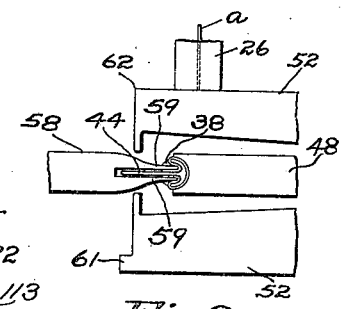
Figure 11:
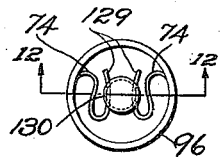
Fig. 11 is a plan view showing the spring secured in the cut or socket member.

From the construction described, it will be apparent that when the spring carrier is in its retracted position as indicated in Fig. 3, the former will be raised through the bed plate of the machine and the opening 37 in the carrier so that the top and spring-forming end of the former will be in a position above the carrier 31. The wire feeding device will then be appropriately operated by its cam to feed a length of wire a in front of the former, substantially as indicated in Figs. 3 and 5; and in order that the length of the wire a thus projecting in front of the former may be of appropriate length for the formation of the spring, a suitable stop is provided for the advancing end of the wire as it is fed. In the present instance of the invention the stop is formed by a projection 61, Figs. 5, 6, 7 and 8, provided on one of the side benders 52. The proper length of wire a having been fed in front of the former 38, it is desirable to cut the wire from the part leading to the source of supply. In the present instance of the invention this is effected by forming the adjacent side bender 52 with a cutting edge as at 62, the construction being such that as the bender slide 46 is moved rearwardly, the cutting edge 62 will cut the wire a at the delivery end of the guide 26 and move the wire to the former. Continued rearward movement of the bender slide carries the front bender 48 from the position of Fig. 5 to that of Fig. 6, and the side benders are correspondingly moved into the position of Fig. 6, the effect being that the wire is first bent around the front of the former as in Fig. 6 to conform the wire to the former. Upon further rotation of the cam 56, the side benders 52 are moved inwardly from the position shown in Fig. 6 to that of Fig. 7, thereby carrying the ends of the wire toward the tongue 44 of the bender, the parts taking the position substantially as indicated in Fig. 7. While the side benders 52 still hold the end portions of the wire against the tongue 44 of the former, the rear bender 58 advances and engages the ends of the wire, Fig. 7, while the side benders still press the ends of the wire against the tongue 44 of the former. As the rear bender 58 thus encloses the ends of the wire between the portions 59 of the rear bender, the wire is of course positively held. As the rear bender 58 then moves frontwardly from the position shown in Fig. 7 to that in Fig. 8, the side benders release the wire as indicated in Fig. 8, and the portions 59 of the rear bender then turn the side portions of the wire into the recess between the tongue 44 and the part 45 of the former, the elements taking the position substantially as indicated in Fig. 8, at which time the wire has been given its desired form. It is to be noted that the formation of the wire into its spring form has taken place at a fixed position above the spring carrier and about the former which has passed through the opening 37 of the spring carrier. It is now desirable to strip the spring from the former and place it in control of the spring carrier that it may be appropriately moved into spring-inserting position. This is done by withdrawing the former from the carrier by movement of the former in a downward direction.

It is appropriate at this time to describe the general character and construction of the opening in the carrier 31. Details on an enlarged scale of this feature of the invention are shown by Figs. 22, 23 and 24, wherein it will be noted that the spring carrier is provided with a spring clamp 63, its front end portion, viewing Fig. 22, being provided with the shoulders 64 and the slot 65, the latter conforming in general contour to the tongue 44 of the former.

Figure 9:
Fig. 9 shows in plan view the spring after being formed and stripped from the former.

The spring clamp 63 which slides in grooves 63' is normally under the influence of a spring 66 which acts upon the pin or projection 67 to maintain the clamp 63 in the position indicated by Fig. 22, a pin 68 on the carrier 31 serving to limit the movement of the clamp. The opening 37 of the carrier 31 has a shoulder 69 which, as the former 38 is lowered with the spring clinging thereto, strips the spring from the former and supports it in the opening 37 of the carrier for transfer to the spring-inserting position. This shoulder is only a slight ridge, sufficient to strip the spring off the smooth outside of the former as it is moved transversely out of the carrier, but not pronounced enough to hold the spring against discharge by the spring transferring or discharging plunger 115, described below. When the spring is received into the opening 37 of the carrier it is of the general shape of the former, as represented at 70 Fig. 9, the curved portion thereof resting on the shoulder 69 of the opening.

As hereinbefore stated, it is desirable in some cases to bend the end portions 71 of the spring downward as the spring is transferred to the cup or socket member, and in order that the spring may be in proper position for such a bending, the slide 63 is provided with a beveled end 72, which engages against the beveled lug 73, just as the carrier 31 reaches a spring inserting position. This forces the shoulders 64 of the slide 63 against the bends 74 of the spring to compress it somewhat so that it is more readily engaged by the transfer plunger 119, as hereinafter described.

Before describing the transferring operation, it will be convenient to refer to the cup or socket forming and transferring mechanism.

Figure 2:
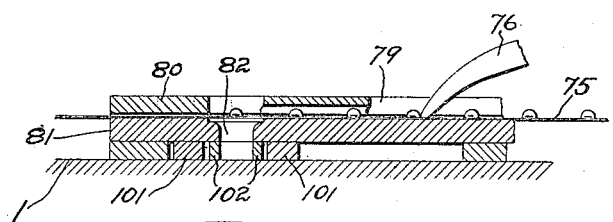
Fig. 2 is an enlarged sectional detail showing the means for feeding the strip of metal having the cups or socket members partially formed therein.
Figure 13:
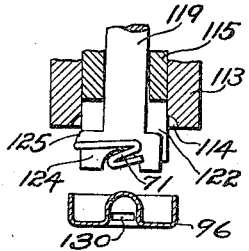
Fig. 13 is an enlarged detail partly in section showing the relation of the parts as the transfer plunger acts upon the end portions of the spring to separate them slightly and turn them downward just prior to inserting the spring in the cup or socket member.
Figures 10, 12, 14:
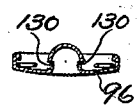
Fig. 10 shows the spring having the end portions bent or turned out of the plane of the spring just prior to its transfer to the cup or socket member.
Fig. 12 is a section on the line 12—12, Fig. 11.
Fig. 14 is a view similar to that of Fig. 13, but at right angles thereto.

The cup or socket member of the fastening is cut from a strip of metal previously provided with a central socketed and slotted stud, a series of such blanks being formed in the strip of metal substantially as set forth in the prior application of Normand, Serial Number 135,744, filed December 8, 1916, and as indicated in Fig. 3, the strip of blanks 75 is fed progressively to the cup or socket forming mechanism by means of a feed pawl 76, Fig. 3, carried by a rocking arm 77 actuated by a cam 78 secured to the cam shaft 12. The pawl 76 extends through a slot 79 formed in the upper portion of a guide, Figs. 2 and 3, through which the strip of blanks is fed to a position beneath the cutter die and the cup flanger, as will presently be described. The guide for the strip of blanks 75 may be variously contrived, but in the present form of the invention, it comprises an upper member 80 and a lower member 81, Fig. 15, the strip of blanks 75 being fed and guided between the two members as indicated in Fig. 15. The lower member 81 has an opening 82 with rounded upper portions, the construction being such that when a blank is cut from the strip, as will presently appear, and the blank is forced downwardly through the opening 82, the edge portions of the blank will be turned upwardly into substantially cup form, as indicated in Figs. 13 and 14 on an enlarged scale.

Secured to and rising from the bed plate 1 of the machine is a bracket 83, Figs. 1 and 3, having a guide head 84, Fig. 1, in which is mounted the slide 85 which may be reciprocated vertically in the guide 84 by any suitable means as, for instance, by the arm 86 actuated by a cam 87, Fig. 3, secured to the cam shaft 12. The detail connections of the arm 86 and slide 85 are not herein illustrated, because they form no essential part of the present invention, and may be of usual or desired character, the construction being such that upon rotation of the cam shaft 12, the slide 85 will be reciprocated in its guide 84. Secured to the slide 85 at its lower end is a cutter die 88, best shown in Figs. 15, 16 and 17, the lower end portion 89 thereof being of a size to enter the opening 90 formed in the upper member 80 of the strip guide, the construction being such that upon reciprocation of the slide 85, the cutter die 88 will enter the opening 90 and cut a blank from the strip 75, substantially as indicated in the succeeding steps of Figs. 15, 16 and 17.

Mounted for reciprocating movement in the slide 85 is a cup flanger 91, best shown in Figs. 15, 16 and 17, the lower end whereof passes through the cutter die 88 and has a recessed portion 92 in its lower end to receive the stud of the blank. The upper end of the cup flanger 91 is connected by any suitable means such, for instance, as the arm 93 and arm 94 connected thereto, and arm 94, in Fig. 3, being in operative engagement with a cam 95 secured to the cam shaft 12, the construction being such that upon rotation of the cam shaft 12, the cup flanger will be given proper reciprocating movement under the dictates of its actuating cam, to engage the blank cut from the strip by the cutter die and force said blank downwardly through the narrow opening 82 of the lower member 81 of the guide. The blank thus forced downwardly will have its side portions formed substantially as indicated in Figs. 13 and 14, that is, the side portions of the blank will be forced upwardly, thereby forming in general shape, the cup or socket member 96, Figs. 13 and 14, and after thus forming the cup or socket member, the flanger and cutter die will rise, leaving the cup or socket member in control of the cup or socket feed mechanism, as will now be described.

Figure 4:
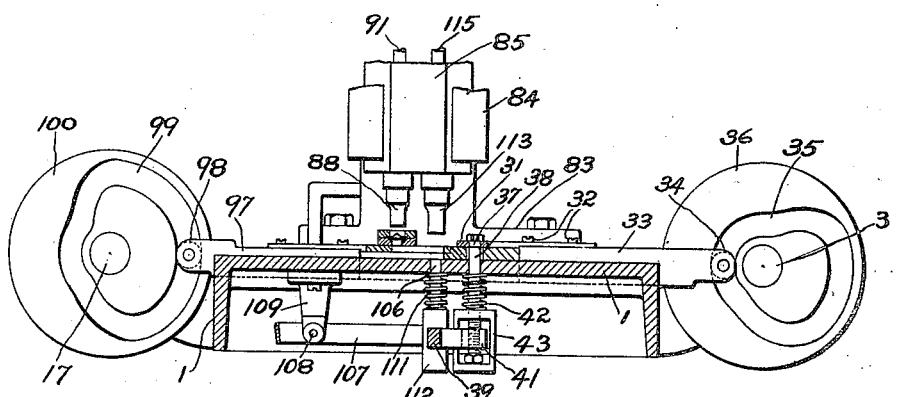
Fig. 4 is a section on the line 4—4, Fig. 3.

Mounted in suitable guides formed in the machine bed, is the slide 97, Figs. 3 and 4, having a projection or roll 98 for engagement with an actuating cam groove 99 formed in the cam 100 secured to the cam shaft 17, Figs. 3 and 4, the construction being such that upon rotation of the cam shaft 17, the feed slide 97 will be reciprocated.

Secured to the feed slide 97 is a cup carrier 101, Fig. 3, having the cup-engaging arms 102. The cup-engaging arms 102, Fig. 3, are normally under the influence of light springs 103, whereby they are forced toward each other to a limited extent. The engaging arms 102 are adapted to receive between them the cup or socket member as it is forced downward by the cup flanger, as hereinbefore described, and as shown on an enlarged scale in Fig. 16, and when thus forced between the cup engaging arms 102, the light springs 103 serve to hold the cup or socket member between them and transfer it from the cup or socket forming station to the inserting station. As indicated in Figs. 15, 16 and 17, the arms 102 move beneath the guide members 80 and 81 so that when the cup is forced by the cup flanger through the guide members, the arms 102 will engage the cup beneath the guide and carry it from the cup or socket member forming station to the spring inserting or transferring station, substantially on the surface plane of the machine bed 1.

As hereinbefore noted, it is desirable that the cup or socket member be held rigidly when in position to receive the spring so that there may be no relative shift in the position of the cup or socket member relative to the spring which is to be inserted therein. To this end, the bed of the machine has secured thereto a fixed portion 104, Figs. 3, 15, 16 and 17, in which are provided the locking recesses 105, Fig. 3, for receiving the ends of the arms 102 and preventing separation thereof when the cup or socket member has been moved from the cup-forming station to the inserting station at the right thereof, Fig. 3.

The spring carrier 31 as hereinbefore noted, is also movable by its actuating means from the spring-forming to the spring-inserting station; and in order that the spring carrier 31 may present the spring above the cup or socket member when the two parts are in transferring position as indicated in Fig. 15, the spring carrier 31 is mounted above the fixed portion 104, the construction being such that when the cup carrier arms 102 move the cup or socket member to the transferring position as indicated in Fig. 15, and the spring carrier moves the spring to the transferring position as indicated in Fig. 15, the spring will be located directly above the cup or socket member ready for transfer. When the parts are in position for transfer of the spring to the cup or socket member, both the spring and the cup or socket member are locked in their respective carriers and in their predetermined relation, in order to cause the end portions of the spring to register with the usual notches in the stud portion of the hub or socket member when the spring is transferred thereto.

Mounted for reciprocating movement through the bed of the machine at the spring-transferring station as indicated in Fig. 15, is a lifter 106, Figs. 4 and 15, carried by a lifter arm 107 pivoted at 108, Fig. 4, to suitable brackets 109 extending downwardly from the under surface of the machine bed 1, the outer end portion of the lifter arm 107 being under control of a lifter cam 110, Fig. 3, the construction being such that upon rotation of the lifter cam 110, the lifter 106 will be actuated for a purpose that will presently appear. It is convenient in the present form of the invention to positively raise the lifter 106 and to withdraw it from its raised position by yielding means such as the spring 111, Fig. 4, the upper portion of which bears against the under surface of the machine bed 1, and the lower portion of which rests upon a collar 112 secured to the lifter arm 107, substantially in the same manner as already described for the connection between the former 38 and the former lifter lever 39, although, as will be apparent, various modifications of means for connection of the lifter and its actuating arm may be devised.

The spring having been shaped about the former in the manner hereinbefore described, and then stripped therefrom and left within the opening 37 of the spring carrier, and the cup or socket member having been died out and flanged from the strip as hereinbefore described and transferred into position between the arms 102, the spring carrier and cup carrier move respectively to the transferring position as indicated in Fig. 15, with the cup or socket member 96 seated upon the upper end of the lifter 106.

Secured to the slide 85 is a lip turner 113, Figs. 1, 15, 16 and 17, the lower end portion whereof has a rounded socket formed therein at 114, best shown on enlarged scale in Figs. 13 and 14, the purpose of which rounded portion 114 is to turn inwardly the upwardly-extending flange of the cup or socket member under conditions as will presently appear.

Mounted for reciprocating movement in the slide 85 and in the lip turner 113 is a transfer plunger 115, the upper end portion of which is connected to a rocker 116 secured to and operated by an arm 117 which may be actuated by a cam 118, Fig. 3, secured to the cam shaft 12, the construction being such that upon rotation of the cam shaft 12, the transfer plunger may be raised and lowered in the slide 85 and within the lip turner 113.

The transfer plunger 115 is formed with a hollow portion at its lower end as indicated in Figs. 19 and 20 in which is loosely mounted the spring bender and transferrer 119, which is normally under the influence of a spring 120 seated between the upper inclined portion 121 of the spring bender and transferrer 119 and the upper end portion of the socket formed in the transfer plunger, the construction being such that the spring bender and transferrer 119 is normally forced downwardly under the yielding action of the spring 120, but is free to move upwardly in the transfer plunger.

The lower extreme portion of the transfer plunger is provided with the slotted portion 122, and at each side of the slotted portion 122, the transfer plunger has bevel portions 123, Fig. 20, which are adapted as the transfer plunger is lowered, to engage between the end portions of the spring and slightly separate these end portions, that they may readily pass over the stud of the cup or socket member and at the same time prevent the spring, during its transfer, from shifting its position relative to the cup or socket member and insure that the end portions of the spring shall register with the usual slots formed in each side of the stud of the cup or socket member.

The lower end portion of the spring bender and transferrer 119 is provided with a head 124 best shown on an enlarged scale in Figs. 13 and 14, the opposite portions of the head resting in the slots 122 of the transfer plunger. The head 124 is provided with a shoulder 125 adapted to engage the curved portion of the spring seated on the shoulder 69 of the opening 37 in the spring carrier and has beveled side portions 126 adapted to engage between the end portions of the spring in a manner similar to the corresponding bevel portions 123 of the transfer plunger to assist holding the spring from shifting movement as it is transferred to the cup or socket member.

In order to normally cause the spring bender and transferrer 119 to assume a slightly-inclined relation to the axis of the transfer plunger 115, the spring bender and transferrer 119 is provided with an inclined pin 127, Figs. 19 and 20, which engages openings 128 in the transfer plunger, the construction being such that when the spring 120, Figs. 19 and 20, forces the spring bender and transferrer downwardly, the spring bender and transferrer will take a slightly-inclined position with respect to the axis of the transfer plunger so that upon downward movement of the transfer plunger, the shoulder 125 formed on the head 124 of the spring bender and transferrer will engage the rounded portion of the spring seated in the spring carrier and the side bevel portions of the head will engage the end portions of the spring to drag it out of engagement with the shoulder 69 slightly in advance of the engagement of the spring by the shoulder, thereby bending the end portions of the spring 71 slightly downward.

The parts being in the position shown by Fig. 15, with the cup or socket member seated on the lifter 106 in transferring position, and locked from shifting movement by the arm 102 of the cup carrier, and the spring seated in the opening 37 of the spring carrier immediately above the cup or socket member, the transfer plunger is actuated downwardly to engage the spring in the opening 37 of the spring carrier, as hereinbefore described, and first bend the ends of the spring downwardly, substantially as indicated in Figs. 13 and 14, to drag the spring out of engagement with the shoulder 69 then, by engagement of the shoulder 125 with the spring, the spring is forced bodily downward into the cup or socket member, whereupon the end portions 129 of the spring engage the recesses 130, Fig. 14, at opposite sides of the stud formed in the cup or socket member, and the rounded or main body portion of the spring is seated in the cup or socket member. The transfer plunger then rises, and when it has passed upwardly from the opening 37 of the spring carrier, the latter moves to the right. The lifter 106 is then raised to lift the cup or socket member and its contained spring toward the lip turner, the upper edge portion of the cup or socket member thereupon engaging the curved recesses 114 in the lip turner 113 and being bent inwardly over the spring, the transfer plunger at this time being raised upwardly into the lip turner. The spring is now seated in the cup or socket member, and the upper edge portion of the cup or socket member is turned inwardly somewhat, but in order to fully secure the spring in the cup or socket member it is desirable that the inturned edges of the cup or socket member be further turned inward and this is effected by a downward movement of the transfer plunger, the edge portions of which engage the inturned edges of the cup or socket member and complete the inward turn thereof, substantially as indicated in Fig. 18. The lifter 106 then descends and simultaneously therewith, the transfer plunger moves downwardly somewhat to strip the cup or socket member from the lip turner, so that the cup or socket member is then free to follow the lifter to its lowered position.

After the spring was transferred to the cup or socket member by the transfer plunger and its spring bender and transferrer 119, and these parts were raised from the opening 37 in the spring carrier, the spring carrier moved back to initial position out of the way and thereupon the cup and its contained spring was lifted upwardly for the inturning action of the lip turner upon the edges of the cup or socket member. When the spring and cup or socket member were thus raised, the cup carrier slide was actuated to return the cup carrier and its arms 102 back to initial position for the reception of another cup or socket member cut from the strip of blanks.

From the construction described it will be noted that the spring is formed and shaped at a single station or spring-forming station, and when thus shaped, is held in the carrier and clamped therein when in transferring position by the clamp 63; and also that the cup or socket member when moved to transferring position, locks or holds the socket member in such position below the spring so that no relative shift is possible between the cup and spring positions while at the transferring station. It will also be noted that as the spring is transferred to the cup or socket member, the transferring mechanism acts to hold the spring from any shifting movement as it is forced from the spring carrier into the cup or socket member, so that at all times the spring and the cup or socket member are fixed and held in predetermined relative position for the ends of the spring to engage the recesses 130 in the stud of the cup or socket member.

After the spring has been transferred to the cup or socket member and the edges of the latter have been turned over the spring as hereinbefore described, and the lifter 106 has dropped to its initial position, the cup or socket member and its contained spring are ready to be ejected from the machine; and to this end any suitable ejecting mechanism may be employed, but in the present instance of the invention a kicker 131, Fig. 3, is provided, and preferably consists of a slide 132 having the kicker 131 secured thereto and normally held in frontward position by a spring 133. In order to give the kicker 131 its desired movement to eject the finished fastening, the slide 132 is provided with an arm 134 which engages a cam path formed in the side of the cam 40, substantially as indicated in Fig. 3, the construction being such that when the finished fastening is lowered by the lifter 106, the kicker 131 moves across the path of the lifter, engages the finished fastening, and forces it backward into a suitable chute which may be provided in the bed plate of the machine as at 135, Fig. 3.

Various modifications may be made in the details of the mechanism described, without departing from the spirit and scope of the invention, as definitely pointed out by the claims.

What is claimed is:—

1. In a machine of the character described, the combination of a carrier for the cup or socket member of a snap fastener, a punch and die for cutting out and turning up the edges of the cup or socket member and forcing it into control of the carrier, means for moving the carrier to spring-inserting position, a spring carrier, means for moving the spring carrier to spring-inserting position above the cup or socket member, and a plunger having a shouldered portion to engage the spring and a portion to enter between the ends of the spring and transfer the spring from the spring carrier to the cup or socket member.

2. In a machine for making snap fasteners, the combination of a carrier having clamping members mounted thereon for clamping and moving the cup or socket member of a snap fastener to spring-inserting position, means for locking the clamping means to hold the cup or socket member in spring-inserting position above the cup or socket member, and means for transferring the spring from its carrier into the cup or socket member while the latter is held in fixed position.

3. In a machine for making snap fasteners, the combination of a cup carrier having spring arms for engaging the cup or socket member of a snap fastener and moving it to spring-receiving position, means for locking the spring arms when they have moved the cup or socket member to said position, means for inserting the snap spring in the cup or socket member while held by the locked spring arms, and means for disengaging the cup or socket member from the arms after the spring has been inserted thereinto.

4. In a machine of the character described, the combination of a cup carrier having spring arms, means for forcing the cup between the spring arms and turning the circumferential flange at an angle to the base of the cup, means for moving the cup carrier to transfer the cup to spring-receiving position, means for locking the spring arms to hold the cup clamped when in said position, and means for inserting the spring into the cup while held clamped by the locked arms.

5. In a machine of the character described, the combination of a carrier for the cup or socket member of a snap fastener, a punch and die for cutting out and turning up the edges of the cup or socket member and forcing it into control of the carrier, means for moving the carrier to spring-inserting position, a spring carrier, means for moving the spring carrier to spring-inserting position above the cup or socket member, a plunger having a shouldered portion to engage the spring and a portion to enter between the ends of the spring and transfer the spring from the spring carrier to the cup or socket member, and means for turning the edge of the cup over the spring.

6. In a machine of the character described, the combination of a carrier for moving a cup or socket member to a spring-inserting position, a spring carrier for moving a spring to the inserting position opposite the cup or socket member, a spring-bending and inserting plunger having a shoulder to engage the body portion of the spring and a part to enter between the ends of the spring and bend them to one side of the plane of the spring and then transfer the spring to the cup or socket member.

7. In a machine of the character described, the combination of a carrier for moving a cup or socket member to a spring-inserting position, a spring carrier for moving a spring to the inserting position opposite the cup or socket member, a clamp for holding the spring in the carrier, a spring bending and inserting plunger having a shoulder to engage the body portion of the spring and a part to enter between the ends of the spring and bend them to one side of the plane of the spring and transfer the spring to the cup or socket member.

8. In a machine of the character described, the combination of a carrier for moving a cup or socket member to a spring inserting position, a spring carrier for moving a spring to the inserting position opposite the cup or socket member, a clamp for holding the spring in the carrier, means operative as the carrier is moved to actuate the clamp, a spring-bending and inserting plunger having a shoulder to engage the body portion of the spring and a part to enter between the ends of the spring and bend them to one side of the plane of the spring and then transfer the spring to the cup or socket member.

9. In a machine of the character described, the combination of means for holding the cup or socket member of a snap fastener in spring-receiving position, means for presenting a spring opposite the cup or socket member, and a spring-inserting member for transferring the spring from its presenting means into the cup or socket member in predetermined directional relation thereto, said spring-inserting member having a part to enter between the end portions of the spring and a shoulder to bear upon the body of the spring.

10. In a machine of the character described, the combination of a carrier having yielding arms to receive between them the cup or socket member of a snap fastener, a punch and die for cutting out and turning up the edges of the cup or socket member, and transferring it to the control of the yielding arms, means for moving the carrier to present the cup or socket member to spring-inserting position, means for locking the yielding arms to hold the cup or socket member positively when in spring-inserting position, and means for inserting the spring into the cup or socket member in predetermined directional relation thereto while the cup or socket member is locked from movement.

11. In a machine of the character described, the combination of a carrier having yielding arms to receive between them the cup or socket member of a snap fastener, a punch and die for cutting out and turning up the edges of the cup or socket member, and transferring it to the control of the yielding means, means for moving the carrier to present the cup or socket member to spring-inserting position, means for locking the yielding arms to hold the cup or socket members positively when in spring-inserting position, means for inserting the spring into the cup or socket member in predetermined directional relation thereto while the cup or socket member is locked from movement, a lifter for lifting the cup or socket member after the spring has been inserted, and an edge turning member acting upon the cup or socket member as it is lifted to turn the edge of the cup or socket member over the spring.

12. In a machine of the character described, the combination of means for moving a cup or socket member of a snap fastener to a spring inserting position and locking it from movement while in said position, a carrier having an opening for carrying a spring to the inserting position above the cup or socket member and locking the spring from movement while in said position, a transferrer for forcing the spring from the carrier to the cup or socket member beneath, a lifter for lifting the cup or socket member and spring together after they have been assembled, an edge turner acting to turn the edge of the cup or socket member over the spring as the lifter moves upward, and means for moving the transferrer to complete the turn of the edge of the cup or socket member and then acting to free the cup or socket member.

13. In a machine for making snap fasteners, a carrier for holding a spring, and a transferrer for transferring the spring from the carrier to the cup or socket member, said transferrer comprising a plunger having a yieldingly-mounted spring engaging portion, and means normally acting to maintain the spring engaging portion out of axial alinement with the plunger.

14. In a machine for making snap fasteners, a carrier for holding a spring, a transferrer for transferring the spring from the carrier to the cup or socket member, said transferrer comprising a plunger having a yieldingly mounted spring engaging portion, provided with a shoulder to engage the main part of the spring in said carrier and a part to engage the sides of the spring, and means normally acting to maintain the spring-engaging portion of the transferrer pressed laterally to one side of the plunger.

15. In a machine of the character described, a slide having fingers for engaging between them the cup or socket member of a snap fastener, means for moving the slide to transport the cup or socket member to spring inserting position, an abutment against which one portion of the cup or socket member bears when in spring inserting position having locking portions for engaging the ends of the fingers to prevent release of the cup or socket member while the spring is being inserted, and means for inserting the spring.

16. In a machine for making snap fasteners, the combination of a reciprocating carrier provided with clamping means thereon for clamping and transferring a cup or socket member from a forming position to a spring inserting position, means for locking the clamping means when the cup or socket member is in the spring inserting position, a spring carrier, means for moving the spring carrier to the spring inserting position, and means for transferring the spring from its carrier to the cup or socket member while that member is locked in position by the clamping means.

17. In a machine for making snap fasteners, the combination of a carrier for a cup or socket member comprising a pair of resilient arms, means for forming a cup or socket member and transferring it to the carrier between the resilient arms, so as to be gripped thereby, reciprocating means for moving the carrier to a spring inserting position, means, adapted to engage the resilient arms when they reach the spring inserting position, to lock them while the spring transferring operation is taking place, and means for inserting a spring in the cup or socket member while it is locked in the carrier.

18. In a machine for making snap fasteners, a carrier for a cup element provided with a central projection, a spring carrier, and means for transferring a spring from the spring carier to a cup in the cup carrier, comprising a recessed plunger, provided with a slot in its lower end, and a spring engaging device mounted in the recess in the plunger, said spring engaging device being recessed at its lower end to slip over the central projection of the cup, and provided with lateral spring engaging portions, movable in the said slot, for engaging the spring and pushing it into the cup.

19. In a machine for making snap fasteners, a carrier for a cup element provided with a central projection, a spring carrier, means for transferring a spring from the spring carrier to a cup in the cup carrier, comprising a recessed plunger, provided with a slot in its lower end, a resiliently mounted spring engaging device mounted in the recess in the plunger, said device being recessed at its lower end to slip over the central projection of the cup and provided with lateral spring engaging portions, one of which is provided with a shoulder, movable in said slot, said spring engaging portions being adapted to engage the spring to push it into the cup.

20. In a machine for making snap fasteners, a carrier for a cup or socket element of the type provided with a central projection, a spring carrier, means for transferring a spring from the spring carrier to the cup or socket element, comprising a recessed plunger provided with a slot in its lower end, a spring engaging device resiliently mounted in the recess in the plunger, said device being recessed at its lower end to engage over the central projection of the cup or socket element and provided with lateral spring engaging portions movable in the said slot, and means acting on the spring engaging device for pressing it laterally to one side in its recess.

In testimony whereof, we have signed our names to this specification, in the presence of two subscribing witnesses.

OSCAR L. SMITH.
HENRY S. NORMAND

Witnesses:
ANNA L. SULLIVAN,
MARTHA C. SCOTT.